US006770482B1

(12) United States Patent
Flanagan et al.

(10) Patent No.: US 6,770,482 B1
(45) Date of Patent: Aug. 3, 2004

(54) METHOD AND APPARATUS FOR RAPID SCREENING OF MULTIPHASE REACTIONS

(75) Inventors: William Patrick Flanagan, Rexford, NY (US); Roger Neal Johnson, Hagaman, NY (US); William Guy Morris, Rexford, NY (US)

(73) Assignee: General Electric, Niskayuna, NY (US)

( * ) Notice: Subject to any disclaimer, the term of this patent is extended or adjusted under 35 U.S.C. 154(b) by 219 days.

(21) Appl. No.: 09/609,921

(22) Filed: Jul. 3, 2000

Related U.S. Application Data

(60) Provisional application No. 60/144,567, filed on Jul. 16, 1999.

(51) Int. Cl.[7] ........................ G01N 31/10; G01N 35/00; G01N 15/06; G01N 33/00; G01N 33/48

(52) U.S. Cl. ............................. 436/37; 436/43; 422/50; 422/68.1; 422/81; 422/99; 422/130; 422/131; 422/102; 422/103; 422/104

(58) Field of Search ........................... 422/50, 68.1, 81, 422/99, 130, 131, 102, 103, 104; 435/7.1; 436/37, 43

(56) References Cited

U.S. PATENT DOCUMENTS 5,534,328 A * 7/1996 Ashmead et al.
5,714,127 A * 2/1998 DeWitt et al. .............. 422/131
5,753,187 A * 5/1998 Reynolds et al.
5,776,359 A * 7/1998 Schultz et al.
5,785,927 A * 7/1998 Scott et al.
5,792,431 A * 8/1998 Moore et al.
5,843,385 A * 12/1998 Dugan
5,866,342 A * 2/1999 Antonenko et al. .......... 435/7.1
5,980,704 A * 11/1999 Cherukuri
5,985,356 A * 11/1999 Schultz
6,004,617 A * 12/1999 Schulta et al.
6,027,695 A * 2/2000 Oldenburg et al.
6,044,212 A * 3/2000 Flavin et al.
6,045,671 A * 4/2000 Wu et al.
6,045,755 A * 4/2000 Lebl et al.
6,126,904 A * 10/2000 Zuellig et al. .............. 422/130
6,190,619 B1 * 2/2001 Kilcoin et al. .............. 422/131
6,238,627 B1 * 5/2001 McGowan et al. ......... 422/130
6,258,323 B1 * 7/2001 Hormann et al. ............. 422/99
6,410,332 B1 * 6/2002 Desrosiers et al. ........... 436/37
6,436,351 B1 * 8/2002 Gubernator et al. ........ 422/102
6,566,461 B2 * 5/2003 Freitag et al. ................ 526/65

FOREIGN PATENT DOCUMENTS

| | | | |
|---|---|---|---|
| DE | 196 32 779 | | 2/1998 |
| EP | 0 400 965 | | 12/1990 |
| EP | 0 438 883 | | 7/1991 |
| WO | WO 97/09353 | | 3/1997 |
| WO | WO 98/07026 | * | 2/1998 |
| WO | WO 98/17391 | * | 4/1998 |
| WO | WO 98/57181 | * | 12/1998 |
| WO | WO 99/24834 | * | 5/1999 |
| WO | WO 99/56877 | * | 11/1999 |
| WO | WO 99/64158 | * | 12/1999 |
| WO | WO 99/64160 | * | 12/1999 |
| WO | WO 99/67024 | * | 12/1999 |
| WO | WO 00/09255 | * | 2/2000 |
| WO | WO 00/14529 | * | 3/2000 |
| WO | WO 00/17413 | * | 3/2000 |

* cited by examiner

*Primary Examiner*—Jill Warden
*Assistant Examiner*—Brian Sines
(74) *Attorney, Agent, or Firm*—Andrew C. Hess; Patrick K. Patnode

(57) ABSTRACT

In one exemplary embodiment, the present invention is directed to a method that comprises providing a reaction substrate having a plurality of substrate reservoirs adapted to receive a reactant system at least partially embodied in a liquid. A thermal unit maintains the reactant system at a first temperature. A head plate is disposed adjacent to the reaction substrate to form a sealed and pressurized headspace above the substrate reservoirs. The head plate is maintained at a second temperature higher than the first temperature. A second reactant may be introduced as a gas into the headspace above the plurality of substrate reservoirs.

17 Claims, 5 Drawing Sheets

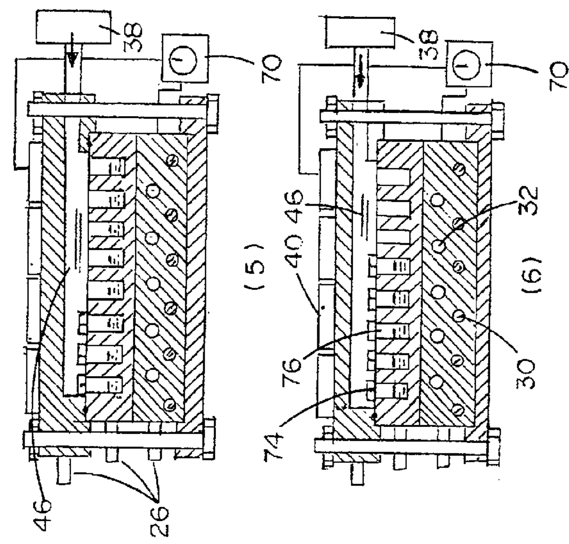
FIG. 5
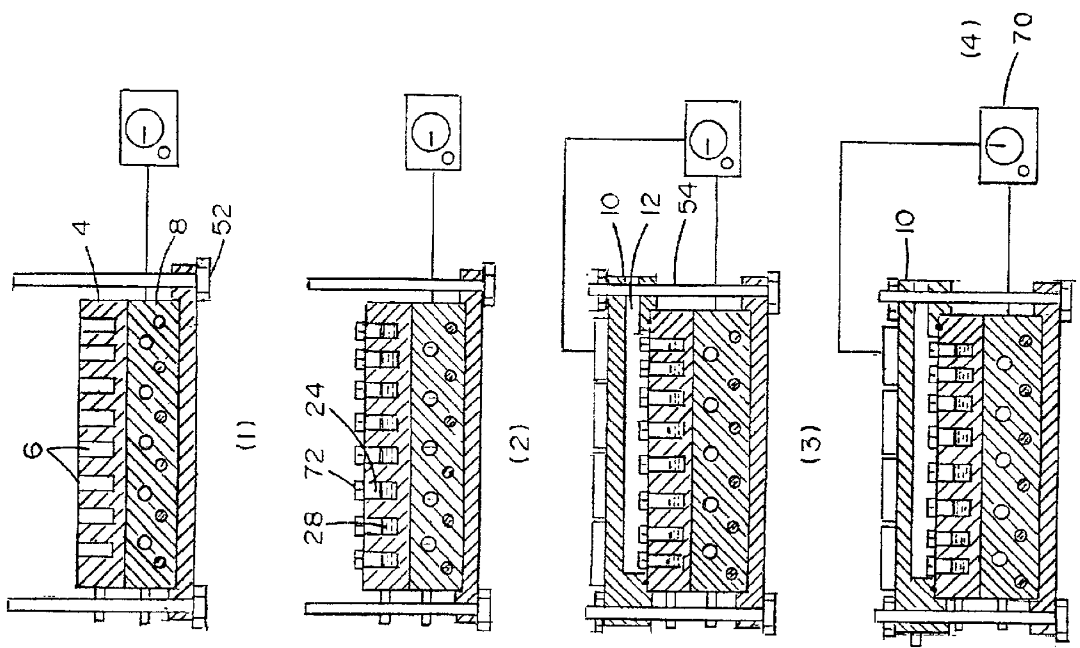

METHOD AND APPARATUS FOR RAPID SCREENING OF MULTIPHASE REACTIONS

CROSS REFERENCE TO RELATED APPLICATIONS

This application claims priority to and the benefit of the filing date of U.S. Provisional application 60/144,567 filed Jul. 16, 1999 and entitled METHOD AND APPARATUS FOR HIGH-THROUGHPUT CHEMICAL SCREENING, which is incorporated herein by reference in its entirety.

BACKGROUND

1 Field of the Invention

The present invention is directed to a method and apparatus for rapid screening of potential reactants, catalysts, and associated process-conditions and, more specifically, to a method and apparatus for rapid combinatorial screening of potential reactants and catalysts in mixed phase reaction systems.

2. Discussion of Related Art

Since its introduction in 1970, combinatorial chemistry has become a popular research tool among scientists in many fields. Combinatorial screening for biological activity has been prevalent in the pharmaceutical industry for nearly twenty years and, more recently, combinatorial screening for improved catalysts for the bulk chemical industries has enjoyed increasing popularity.

Early efforts in combinatorial screening of liquid phase reactions have focused on catalyst screening. Before the application of the combinatorial approach, catalyst testing was traditionally accomplished in bench scale or larger pilot plants in which feed to a continuous flow reactor was contacted with a catalyst under near steady state reaction conditions. This type of test system can be difficult to reproduce at the micro-scale required for combinatorial chemistry. Rapid combinatorial screening of reactants, catalysts, and associated process conditions requires that a large number of reactions or catalytic systems be tested simultaneously, while still providing a meaningful correlation between test results and eventual performance in a production-scale reactor.

Thus, there has been a lag in the development of combinatorial screening for production scale reactions. One reason has been the difficulty in emulating large-scale reactions at the micro-scale necessary for combinatorial work. In particular, special problems can arise for reactions that are significantly dependent on mass transport rates or flow configuration. For example, reactions may require that a liquid phase be saturated with a gaseous reactant for substantial phase transfer. This can be difficult to consistently reproduce for multiple samples on a small scale.

Furthermore, most combinatorial work to date has focused on "solid phase" reactions. It is known that a wide variety of organic reactions can be carried out on substrates immobilized on resins. However, a substantial number of production scale reactions are "liquid phase" or "mixed phase," and are typically carried out in continuous flow reactor systems.

A Finally, many combinatorial systems are highly complex and therefore may require significant effort and expense to be optimized for individual experiments. For many applications, it would be preferable to have a simple, compact apparatus which would be suitable for bench-top experiments and yet enable high-throughput chemical screening utilizing a variety of reaction formats.

As the demand for bulk chemicals has continued to grow, new and improved methods of producing more product with existing resources are needed to supply the market. However, the identities of additional effective reactants and catalyst systems for these processes continue to elude the industry. What are needed are new and improved methods and devices suitable for rapid screening of potential reactants, catalysts, and associated process conditions.

SUMMARY OF THE INVENTION

Accordingly, the present invention is directed to a method and apparatus for rapid screening of multiphase reactant systems. In one exemplary embodiment, the apparatus includes a reaction substrate having a plurality of substrate reservoirs adapted to receive a reactant system at least partially embodied in a liquid. A first heating source maintains the reactant system at a first temperature. A head plate is positioned relative to the reaction substrate such that a closed headspace is formed above the substrate reservoirs. The head plate includes a second heating source to maintain the head plate at a second temperature higher than the first temperature.

An exemplary method of the invention includes providing a plurality of substrate reservoirs and introducing a reactant system at least partially embodied in a liquid into individual substrate reservoirs. A headspace is provided to maintain the reactant system at a defined pressure and atmosphere and to avoid condensation upon heating of the liquid reactant system. A gaseous reactant may be included in the headspace atmosphere.

BRIEF DESCRIPTION OF THE DRAWINGS

Various features, aspects, and advantages of the present invention will become more apparent with reference to the following description, appended claims, and accompanying drawings, wherein

FIG. 5 is a schematic representation of an aspect of an embodiment of the present invention.

DETAILED DESCRIPTION OF PREFERRED EMBODIMENTS

Figure 1:
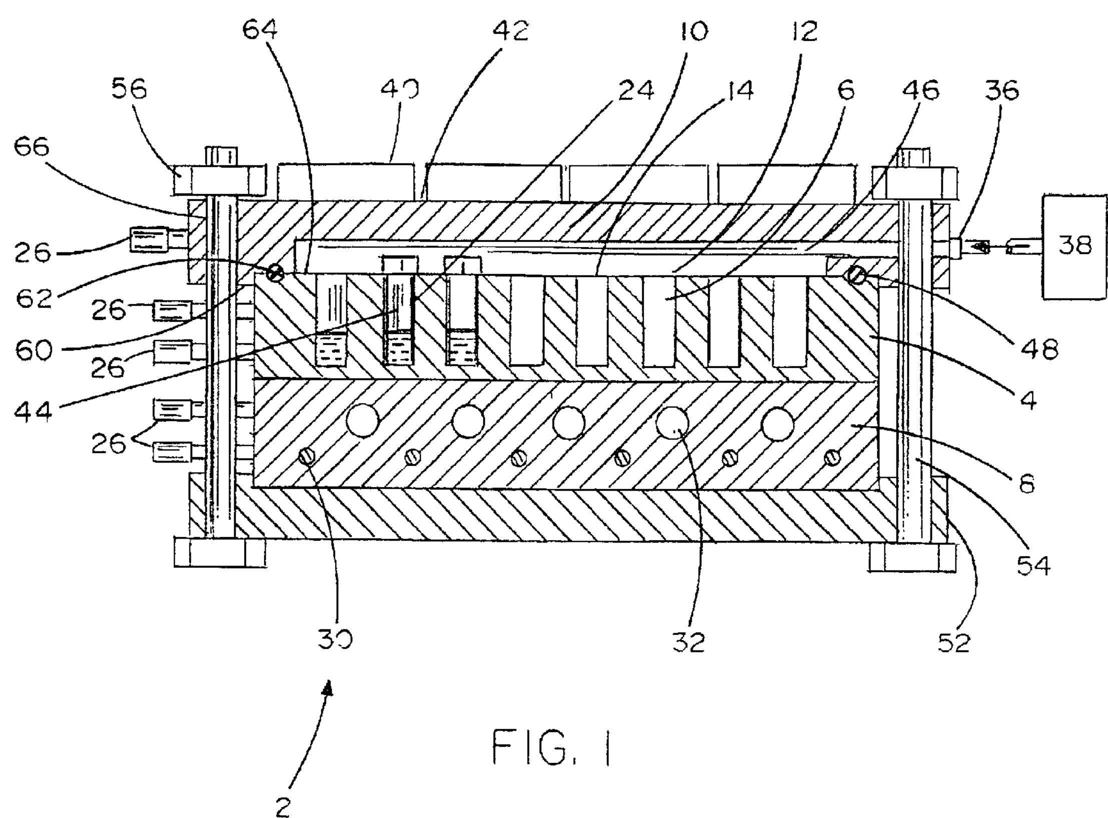
FIG. 1 is a cross sectional view of an aspect of an embodiment of the present invention.

Terms used herein are employed in their accepted sense or are defined. In this context, the present invention is directed to a method and apparatus for rapid screening of potential reactants, catalysts, and associated process conditions.

The need to evaluate variable concentrations of a single catalyst as well as various combinations of catalysts can dramatically add to the number of catalytic materials that require testing. Discovery of adequate catalysts for mixed phase polymerization reactions can be accelerated by using combinatorial chemistry approaches, as demonstrated in other systems. One difficulty in applying combinatorial chemistry to mixed phase polymerization reactions, however, is the need to reproduce flow configuration and mass transport kinetics required for large scale production. For example, potential reactants comprising a gas phase need to be presented to liquid phase reactants in a manner that will maximize reaction kinetics while reproducing the conditions used in large scale batch reactors.

The method and apparatus of the present invention is generally useful for conducting simultaneous mixed phase reactions. Thus, in an embodiment, an apparatus includes a substrate having a plurality of wells adapted to receive a reactant system at least partially embodied in a liquid; a first heating source to maintain the reactant system at a first temperature; and a head plate disposed adjacent the substrate to form a headspace above the wells. The head plate is preferably maintained at a second temperature higher than the first temperature. The components of the apparatus are preferably formed of strong, durable materials such that the apparatus can accommodate elevated reaction pressures of at least about 50 atmosphere and reaction temperatures of at least 200° C. Reactions can be conducted in glass vials which are compatible with a variety of analysis systems.

Thus, an aspect of the present invention is an apparatus, one embodiment of which comprises a reaction substrate comprising at least one substrate reservoir at a first temperature; a thermal unit in communication with the reaction substrate; and a head plate at a second temperature positioned adjacent to the reaction substrate and forming a headspace adjacent to the substrate reservoir. The head plate may secure a sealed headspace stable to pressures up to about 50 atmosphere. The substrate reservoir may comprise multiple reaction wells including, but not limited to, an array sized to accommodate reaction tubes. Preferably, the head plate includes a port for the entry of gas into the headspace. Additionally, temperature detectors may be included in the head plate and the reaction substrate to enable precise control of reaction conditions by an external control system. In one embodiment, individual substrate reservoirs include a reactant system at least partially embodied in a liquid. In one embodiment, the headspace includes a second reactant introduced as a gas.

Another aspect of the invention is a method, one embodiment of which includes the steps of providing a reaction substrate having a plurality of wells and introducing a reactant system at least partially embodied in a liquid into the wells. The reactant system is maintained at a first temperature. The method further includes providing a headspace above the wells which enables introduction of additional reactants in a gas phase while substantially preventing condensation outside of the wells. The liquid reactant is preferably maintained at a level such that the reaction is essentially independent of mass transport of a second gaseous reactant into the liquid reactant.

In an alternative embodiment, the method comprises the steps of: providing a reaction substrate comprising at least one substrate reservoir; introducing a reactant system at least partially embodied in a liquid into the substrate reservoir; providing an enclosed headspace above the substrate reservoir; maintaining the substrate reservoir at a defined temperature; and maintaining the headspace at a defined atmosphere and pressure. In one embodiment the head plate is heated at a temperature greater than the temperature of the reaction substrate to prevent condensation outside of the substrate reservoir. Temperature detectors enable the precise control of the reaction substrate and head plate temperature by an external control system. The substrate reservoir may include, but is not limited to, an array of reaction tubes comprising a septum. The method may include heating the headspace and providing a gas to the headspace at pressures up to about 50 atmosphere. In one embodiment, the method comprises a gaseous reactant in the headspace. Thus, the liquid reactant may further comprise a thickness L which is sufficient to allow the reaction to be independent of mass transport rates of reactants in the gas phase.

Referring now to FIG. 1, a reactor 2 for the rapid screening of potential reactants, catalysts and reaction conditions is shown. In one embodiment, reactor 2 includes a thermally-controllable reaction substrate 4 having at least one, but preferably many, substrate reservoir(s) 6 for receiving separate samples or reactant systems to be analyzed. The reactor 2 additionally includes a thermally-controllable head plate 10 positioned adjacent to the substrate reservoir 6 of reaction substrate 4. Head plate 10 includes walls that define a sealed headspace 12 adjacent to substrate reservoir 6. Preferably, headspace 12 forms a channel between a gas inlet port 36 in head plate 10 and the substrate reservoir 6 in reaction substrate 4. The port 36 delivers one gas or a combination of reactant gases 46 from a gas supply 38 into headspace 12. The headspace 12 is sealed such that the desired reactant gas 46 can be delivered to the substrate reservoir 6 at a pressure. Thus, by reacting multiple reactant systems in the substrate reservoirs 6, under controlled temperatures, with the reactant gas 46, at a controlled pressure, the reactor 2 enables the study of multiple reactants simultaneously.

Figure 2:
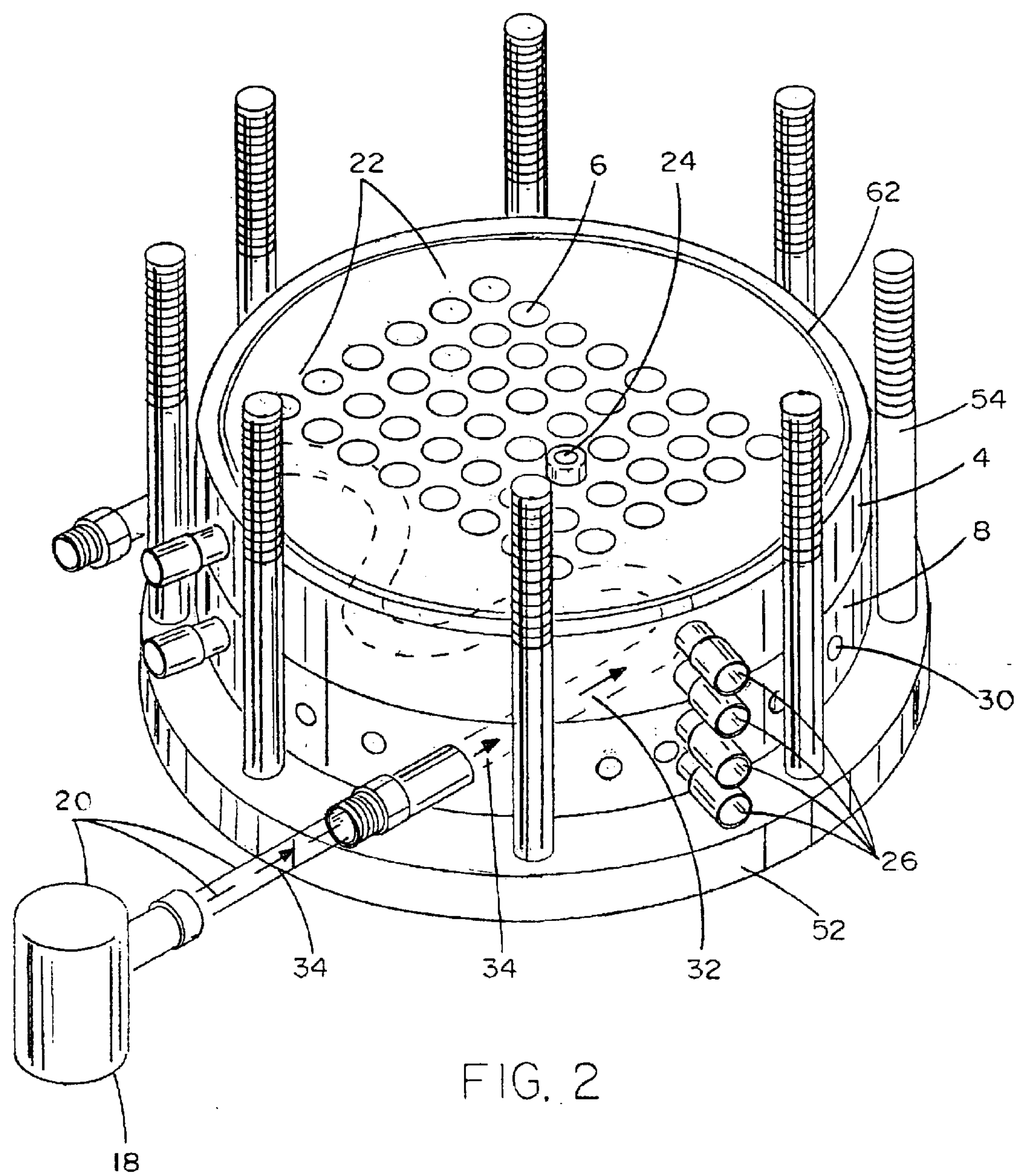
FIG. 2 is a perspective view of an aspect of an embodiment of the present invention.

In one embodiment, the substrate reservoir 6 is sized to receive glass reaction vials 24. For example, 1.8 ml vials commonly used for gas chromatograph autosamplers can be employed. Referring also to FIG. 2, in a preferred embodiment, reaction substrate 4 contains multiple wells 6 in an array 22. The embodiment in FIG. 2 shows an orthogonal (6×8) array, although arrays of other shapes and sizes may be utilized.

Preferably, reaction substrate 4 is formed of a substantially rigid, lightweight, thermally conductive material, such as aluminum or the like. Even more preferably, one or more resistance temperature detectors 26 are mounted at various locations within reaction substrate 4 in order to monitor temperature variations.

In a preferred embodiment, reaction substrate 4 is positioned adjacent to, and in thermal communication with, a thermal unit 8. Thermal unit 8 adjustably maintains reaction substrate 4 at one or a series of temperatures, thereby heating or cooling the samples or reactant systems within substrate reservoir 6. Thermal unit 8 includes a thermally conductive material and a heating source 30 and a cooling source 20 to maintain the reaction temperature within a desired range. Preferably, thermal unit 8 is adjacent to at least one surface of reaction substrate 4. For example, in the embodiment shown in FIG. 2, reaction substrate 4 sits directly on thermal unit 8. Thermal unit 8 is preferably formed of a thermally conductive material, such as copper or aluminum or other suitable materials. More preferably, thermal unit 8 is in thermal communication with reaction substrate 4 such that variations in the temperature of thermal unit 8 are quickly transmitted to the reaction zone 28 in substrate reservoir 6. Although shown as separate components, reaction substrate 4 and thermal unit 8 may be integrally formed. Heating source 30 includes cartridge resistance heaters 30 mounted horizontally within the thermal unit 8, although other heating sources may be utilized. Cooling source 20 includes a pump 18 delivering a cooling agent 34 such as water or freon through a serpentine channel 32 within thermal unit 8 (FIG. 2), although other cooling sources may be utilized. As described above for reaction substrate 4, multiple resistance temperature detectors 26 can be mounted at various locations within thermal unit 8 in order to monitor temperature variations.

Preferably, head plate 10 is formed of a substantially rigid and corrosion resistant material, such as stainless steel, hastalloy, INCONEL™ material, titanium, tantalum or other suitable materials. In a preferred embodiment, the thermally-controllable head plate 10 includes a heating source 40 to maintain head plate 10 at a temperature higher than the reaction temperature in the substrate wells. Acceptable heating sources 40 include surface heaters mounted on the upper surface 42 of head plate 10, although other heating sources may be utilized. Differential heating of head plate 10 substantially reduces condensation of reaction solvent that may be present in a vapor phase 44 of reaction zone 28. Preferably, temperature detectors 26 are mounted in head plate 10 to control and monitor temperature within the head plate 10.

In the embodiment shown in FIG. 1, head plate 10 comprises a seal 48 for preventing reactants from being expelled during operation. Preferably, seal 48 is positioned adjacent to lower surface 60 of head plate 10. Even more preferably, a groove 62 can be provided in the upper surface 64 of substrate reservoir 4 to receive seal 48. Seal 48 is preferably selected from an o-ring or high temperature gasket or other appropriate seals. Suitable seals include VITON® o-ring seals available from E.I. DuPont de Nemours & Co., Inc., Wilmington, Del.

Figure 3:
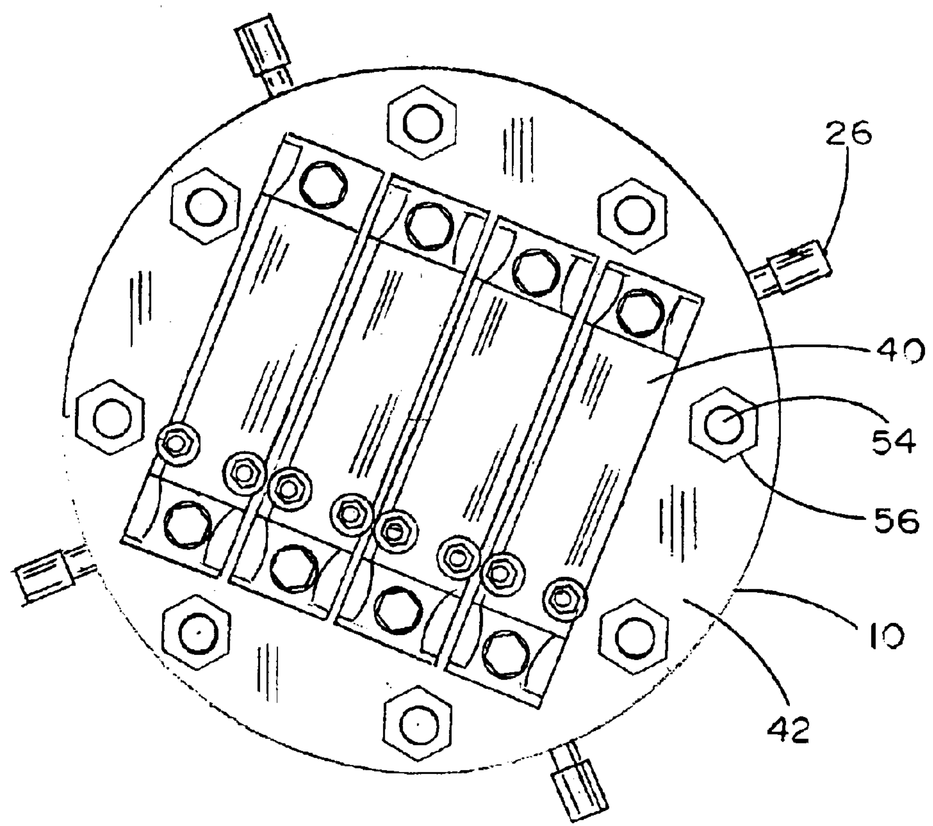
FIG. 3 is a top view of an aspect of an embodiment of the present invention.

Further, the reactor 2 preferably includes a base plate 52 that supports the other components of the reactor. Base plate 52 is preferably formed of a rigid material such as carbon steel or stainless steel, or an appropriate alloy. The assembled reactor 2 can be held together with a plurality of bolts or studs 54. Preferably, studs 54 on base plate 52 are inserted through apertures 66 on head plate 10. In this embodiment, fasteners 56 on studs 54 can be tightened to provide clamping force and maintain effective contact among reaction substrate 4, thermal unit 8 and head plate 10. As shown in FIGS. 2 and 3, clamping is preferably achieved through the use of multiple studs 54 arranged around the perimeter of the head plate 10 and base plate 52. The clamping force is preferably sufficient to maintain the seal between head plate 10 and reaction substrate 4 and to ensure effective heat transfer between thermal unit 8, reaction substrate 4 and substrate reservoir 6.

During the reaction, headspace 12 is maintained at pressures greater than 1 atmosphere. Preferably, headspace 12 is maintained at a pressure of up to about 20 atmosphere. Even more preferably, headspace 12 is maintained at a pressure of up to about 45 atmosphere. Most preferably, headspace 12 is maintained at a pressure of up to about 50 atmosphere.

Figure 4:
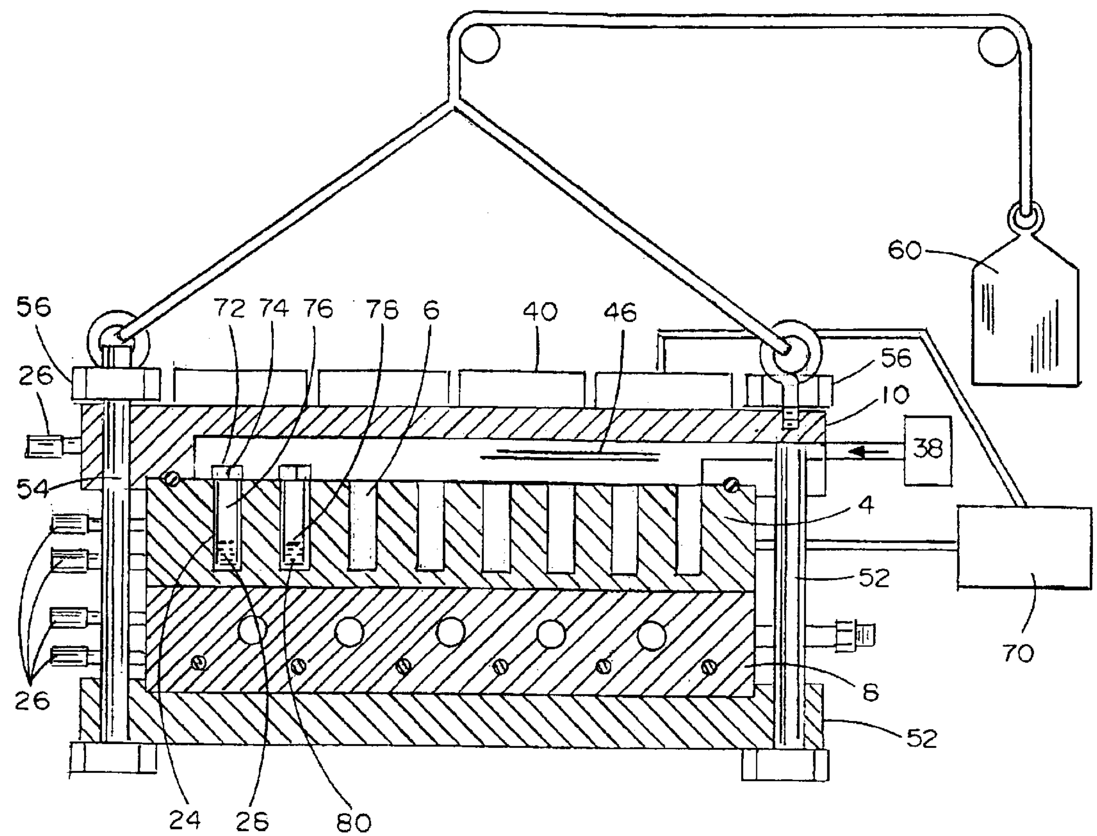
FIG. 4 is a cross sectional view of an aspect of an embodiment of the present invention.

Referring now to FIG. 4, the configuration of reactor 2 allows vials 24 containing previously prepared reactant systems to be inserted into substrate reservoir 6 of reaction substrate 4. The reactant systems, however, may be directly added to the substrate reservoir 6. In the embodiment shown, head plate 10 is lowered onto reaction substrate 4 and a clamping force applied by fasteners 56 on studs 52. In a preferred embodiment, a counterweight system 60 is employed to facilitate movement of head plate 10 with minimal effort. Thermal unit 8 can be adjusted to the appropriate temperature, and gas 46 pumped into sealed headspace 12. Preferably, reactor 2 incorporates a computer-based automated control system 70, which monitors and controls various operations such as the gas supply to and venting of headspace 12, and the heating and cooling functions of the head plate 10, thermal unit 8 and reaction substrate 4. Preferably, temperature detectors 26 positioned on head plate 10, reaction substrate 4 and thermal unit 8 are in communication with control system 70. More preferably, control system 70 automatically logs temperature and pressure data for each reaction.

In an alternative embodiment, the present invention is directed to a combinatorial method to perform multi-phase polymerization reactions using a micro-reactor having multiple reaction vessels. In one aspect of the invention, each vessel contains a first reactant system at least partially embodied in a liquid and a second reactant system at least partially embodied in a gas. Preferably, the liquid forms a film having a thickness L sufficient to allow the reaction rate of the homogeneous chemical reaction to be essentially independent of the mass transport rate of a second reactant system into the liquid. The reaction vessels are disposed within the wells of the reaction substrate. The head plate is clamped to the reaction substrate to form a sealed headspace above the reaction vessels. In a preferred embodiment, a second gaseous reactant system is provided to the reaction zone under pressure. The head plate is maintained at a temperature above the reaction temperature to prevent condensation outside the reaction vessels.

Thus, in one aspect, the invention comprises a method for rapid screening of potential reactants, catalysts and reaction conditions. As shown in FIG. 5, in one embodiment the method comprises the steps of: (1) providing a reaction substrate 4 having at least one substrate reservoir 6; (2) introducing a reactant system 28 at least partially embodied in a liquid into the substrate reservoir 6; (3) providing an enclosed headspace 12 above the substrate reservoir 6; (4) maintaining the substrate reservoir 6 at a defined temperature; (5) maintaining the headspace 12 at a defined atmosphere by pumping in gas 46 at a defined pressure from gas supply 38; and (6) substantially preventing condensation outside of the substrate reservoir 6 by heating heaters 40 on head plate 10 to a temperature greater than the temperature of reaction substrate 4.

Unless otherwise noted, the term "reactant system" can include reactants, solvents, carriers, catalysts, and chemically inert substances that are present to affect a physical property of one or more components of the reactant system. In this regard, a liquid can itself be a component of the first reactant system, and likewise, a gas can be a component of the second reactant system. In alternative embodiments, the first reactant system can be dissolved or suspended in the liquid and the second reactant system can be dissolved in the gas. In other embodiments, the first reactant system can be submersed or entrained in the liquid.

In a preferred embodiment and referring back to FIG. 4, substrate reservoir 6 comprises wells. More preferably, substrate reservoir 6 is sized to accommodate reaction tubes 24. Even more preferably, the tubes comprise a septum cap 72 at one end. Thus, the method contemplates that upon introduction of gas 46 into reactor headspace 12, elevated pressure in headspace 12 will drive gas 46 from headspace 12 outside reaction tubes 24 through an aperture 74 in septum cap 72 and into the headspace 76 inside reaction tubes 24. Preferably, the atmosphere in reactor headspace 12 will equilibrate with the headspace 76 inside reaction tubes 24.

Thus, in one embodiment, reactor headspace 12 comprises a high pressure seal which is stable to elevated pressure in the headspace 12. Preferably, reactor headspace 12 comprises pressure of greater than 1 atmosphere. More preferably, headspace 12 is maintained at a pressure of up to 20 atmosphere. Even more preferably, headspace 12 is maintained at a pressure of up to 45 atmosphere. Most preferably, headspace 12 is maintained at a pressure of up to 50 atmosphere.

Preferably, head plate 10 is heated to prevent condensation of gaseous reaction components. Thus, in one embodiment, head plate 10 comprises surface heaters 40. More preferably head plate 10 comprises resistance temperature detectors 26 in communication with control system 70 to monitor and control the temperature in head plate 10.

In one embodiment, the thickness of the liquid film allows the reaction rate to be "essentially independent" of the mass transport rate of a second gaseous reactant system into the liquid. In this context, "essentially independent" means that in comparison with other possible rate limiting factors, mass transport limitations are sufficiently low to allow comparative evaluations of potential reactant system components. Optimum film thickness values can vary based on reaction conditions and the identity of reactant system components. Those skilled in the art will readily realize that in various systems, a minimum film thickness may be required to overcome the effects of evaporation or the formation of micro amounts of precipitate and the like. As such, optimum film thickness may not equate to the thinnest possible film that can be formed in a given application.

For example, in a homogeneous liquid-phase reaction in which the availability of oxygen in the liquid phase is the rate limiting factor, mass transport can be expressed in the following manner. First, it is assumed that the reaction is a first order liquid-phase homogeneous reaction, or is limited by the gaseous reactant (e.g. oxygen) dissolved in the liquid. Second, mass transport effects in the gas phase are ignored, since the transport rate in the gas phase is significantly higher than the transport rate in the liquid phase. Third, it is assumed that the gas contacts the liquid film only on the top surface of the film and that the film has uniform thickness. It is noted that the amount of gas available at the gas/liquid interface can also be increased by increasing the pressure of the gas in the reaction vessel. With these assumptions in mind, the steady state relationship among the liquid film thickness (L), the rate constant (k), and the diffusivity (D) of dissolved gas in the liquid can be expressed as follows:

$$L=b\sqrt{\mathrm{D/k}} \quad (1)$$

It is noted that k denotes a first order reaction rate constant of the homogeneous chemical reaction with respect to the dissolved form of the gaseous reactant system (e.g. oxygen) in the liquid.

The rates themselves should be substantial enough to be accurately measurable, so that differences among rates can be evaluated, thus allowing comparison among potential reactants and catalysts. In this context, it is preferred that b has a value between 0 and 5. This defines a minimum average-to-surface dissolved gas (e.g. oxygen) concentration ratio (or reaction rate) of approximately 20% (b=5). More preferably, b has a value between 0 and 2, which defines a minimum average-to-surface concentration ratio of approximately 48% (b=2). In various applications, other acceptable values for b can be determined with reference to the following relationship between the film thickness and the concentration profile:

$$\frac{CA(z)}{CA(0)}=\frac{\cosh b(1-z/L)}{\cosh b} \quad (2)$$

In the preceding relationship, the value of z is 0 at one surface of the film (i.e., the top), and, if the reaction is carried out in a vessel that supports the film from the bottom, the value of z is L at the opposing surface of the film (i.e., the bottom). It is also contemplated that the film may be supported on its sides (e.g., in a capillary tube or the like) or may be suspended in another manner that allows gas to be presented to both the bottom and top surfaces of the film simultaneously. In this situation, the value of z is L at the midpoint of the film.

As noted, mass transport in the gaseous phase may be increased by pressurizing the gas; therefore, it is preferred that the gas be maintained at a pressure greater than 1 atmosphere while in contact with the liquid. Many homogeneous reactions respond favorably to increased temperature; therefore, in alternative embodiments, the liquid can be maintained at temperatures above 0° C. while in contact with the gas.

Thus, referring now to FIG. 4, in one embodiment, at least one reactant in reactor 2 comprises a gas 46 in headspace 12. In a preferred embodiment, reactant 28 in substrate reservoir 6 comprises a liquid having a thickness L. Preferably thickness L is sufficient to allow the reaction to be independent of the mass transport rate of gaseous reactant 46 into liquid reactant 28. Even more preferably, thickness L is defined by equation (1) above, where k is the rate constant of the reaction being studied and D is the diffusivity of gaseous reactant 46 in the liquid reactant 28. In this embodiment, b is preferably defined by equation (2) above, where the value of z ranges from a minimum of 0 at the surface 78 of liquid reactant 28 adjacent to gaseous reactant 46 to a maximum of L at the area 80 of said liquid reactant 28 furthest from gaseous reactant 46. Thus, in one embodiment, as for example a capillary tube, the liquid reactant can have at least two surfaces exposed to a gaseous reactant. Preferably, b ranges from 0 to 5. More preferably, b ranges from 0 to 2.

In various embodiments, the invention contemplates that reaction tubes 24 are subjected to analysis for product formation. Preferably such analysis is a method such as size exclusion chromatography, spectroscopy, nuclear magnetic resonance (NMR), and high pressure liquid chromatography (HPLC).

As an example, and again referring to FIG. 5, an embodiment of an aspect of the invention comprises the following steps. Thermal unit 8 and base plate 52 are assembled, and reaction substrate 4 is positioned on top of thermal unit 8 (step 1). A predetermined amount of reactants 28 at least partially embodied in a liquid comprising a film thickness L are added to individual reaction vials 24. The invention contemplates that the use of individual reaction vials will enable multiple reagents or catalysts to be tested in one experiment. The vials 24 are sealed with a septum cap 72 and placed in wells 6 in reaction substrate 4 (step 2). Head plate 10 is then lowered on to reaction substrate 4 with the aid of counterweight system 60 (see FIG. 4) and positioned so that base plate studs 54 can be fastened to head plate 10 (step 3). Once a seal between head plate 10 and reaction substrate 4 has been established, controller 70 is used to heat thermal unit 8 (step 4). Gas 46 is pumped from gas supply 38 into head space 12 to establish an atmosphere of predetermined pressure (step 5). The gas may be a gas inert to the reaction, or may comprise a second reactant. The invention contemplates that the atmosphere in the headspace outside of the reaction vial 12 will equilibrate with the atmosphere inside the reaction vial 76, thereby presenting gaseous reactants 46 to each set of liquid reactants presented in each vial. Computer 70 controlled resistance temperature detectors 26 enable precise control of the temperature of the reaction substrate, thermal unit and head plate. Surface heaters 40 on the head plate 10 are adjusted to prevent condensation of gas 46 in the headspace 12 (step 6). To terminate the reaction, heaters 30 in thermal unit 8 are turned off and a cooling agent 34 is pumped through channels 32 in the thermal unit 8. Once the reaction substrate 4 is cooled, the head plate 10 is removed with the aid of the counterweight 60 (FIG. 4), and reaction vials 24 are removed for subsequent analysis.

In various alternative embodiments, the method and apparatus of the present invention may provide one or more of the following advantages over conventional screening techniques:

1. Small common headspace minimizes the loss of reaction solvents via partitioning into the headspace;
2. Small thermal mass enables quick and accurate control of reaction temperature, which allows for rapid heat-up and cool-down cycles and uniform temperature distributions for reproducible experimental results;
3. Automation allows high-throughput screening with minimal manpower;
4. Modular design and construction provides research flexibility in the event that modifications are required for future research efforts; or
5. Rapid cycle time allows apparatus to support the needs of several research projects.

The following example is provided in order that those skilled in the art will be better able to understand and practice the present invention. This example is intended to serve as an illustration and not as a limitation of the present invention as defined in the claims herein.

Example

In one embodiment, the multi-well combinatorial chemistry catalyst screening reactor is a pressure vessel (45–50 atm.) reactor with automated heating and cooling capabilities. In this embodiment, the reaction substrate has 48 wells, each sized to hold a standard 1.8 ml glass vial into which appropriate reagents, catalysts and solvents are placed. The system can be heated up to 200 degrees Celsius and pressurized with a gas specific to the reaction being studied. Typical gases employed include nitrogen, air, oxygen-enriched air, or carbon dioxide. The invention also contemplates the use of mixed gases, such as carbon monoxide with enriched air and the like, using mass flow controllers to form an appropriate feed gas mixture.

The reaction substrate is heated by cartridge heaters placed in a heating/cooling block (thermal unit) upon which the reaction substrate is placed. The head plate, which is used to form a pressurized headspace above the reaction vials, is heated separately using surface heaters. Cooling is accomplished by running tap water through cooling channels in the heating/cooling block. The supply of gas to the head space, heating and cooling of the reaction substrate, and heating of the head plate are all computer controlled. Thus, the overall reactor set-up includes the reactor vessel, a gas supply system, a heater control system, a cooling water supply system, and a computer that has been programmed to operate the gas supply and pressurization functions as well as the heating and cooling functions.

Specifically, the reactor includes a circular carbon steel base plate, a copper heating/cooling block (thermal unit), an aluminum 48-well reaction block (reaction substrate), and a stainless steel heat plate. The aluminum 48-well reaction block is 1.44 inch thick×7 inch diameter, with 48 vertical holes (1.06 inch depth×0.5 inch diameter; drilled from above) arranged orthogonally (6×8 array). This block also has a variety of thermal sensors for temperature monitoring and control. The stainless ail steel head plate is 1.38 inch thick×8.85 inch diameter. The head plate seals to the aluminum reaction block using a VITON® o-ring that fits into a groove in the aluminum reaction block. Surface heaters are mounted on top of the head plate in order to keep the head plate sufficiently hot to avoid condensation of reaction components within the reactor headspace. Several thermal sensors are mounted in the head plate for temperature monitoring and control. The surface heaters are temperature feedback-controlled using computerized control system.

The copper heating/cooling block is 1 inch thick×7 inch diameter. The block has serpentine channels (0.312 inch diameter) for cooling water, various thermal sensors for temperature monitoring and control, and seven cartridge heaters (¼ inch diameter) inserted horizontally into the block. The cartridge heaters are powered by a separate 220 VAC circuit. Power to the cartridge heaters is feedback-controlled by a PID (proportional-integral-derivative) temperature control algorithm that is part of the computer control software. The carbon steel base plate is 0.8 inch thick×8.85 inch diameter. The plate has eight tapped holes (½" diameter) arranged around the perimeter for studs that are used to clamp the copper heating/cooling block and aluminum reaction block between the head plate and base plate. This clamping secures the reactor to the high pressures used in the head space above the reaction vials.

It will be understood that each of the elements described above, or two or more together, may also find utility in applications differing from the types described herein. While the invention has been illustrated and described as embodied in a method and apparatus for rapid screening of multiphase reactions, it is not intended to be limited to the details shown, since various modifications and substitutions can be made without departing in any way from the spirit of the present invention. For example, robotic equipment can be used to prepare samples and various types of parallel analytical screening methods can be incorporated. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A method for rapid screening of potential reactants, catalysts and reaction conditions, the method comprising:

adding a plurality of reactant systems at least partially embodied in liquid to a reaction substrate comprising a plurality of substrate reservoirs to form a plurality of liquid reactant systems, wherein the reaction substrate has an adjustable first temperature;

maintaining an adjustable pressure in a sealed headspace in communication with the reactant system;

adding a gas to the sealed headspace wherein the gas equilibrates with each of the plurality of liquid reactant systems;

maintaining said headspace at a second temperature;

allowing the gas to react with the plurality of liquid reactant systems for a predetermined amount of time; and analyzing results thereof in an effort to discover potentially effective reactants, catalysts and reaction conditions, wherein said plurality of reactant systems at least partially embodied in liquid each comprises a film having a thickness L.

2. The method of claim 1, wherein the second temperature is greater than the first temperature.

3. The method of claim 1, further comprising providing an external controller, wherein the controller maintains the reaction substrate at said first temperature and the headspace at the second temperature.

4. The method of claim 1, wherein said plurality of reactant systems each comprises reactants dissolved, suspended, submersed, or entrained in said liquid.

5. The method of claim 1, wherein the adjustable pressure in said sealed headspace is in the range of between about 1 atmosphere and about 50 atmosphere.

6. The method of claim 5, wherein the adjustable pressure in the sealed headspace is in the range of between about 1 atmosphere and about 45 atmosphere.

7. The method of claim 6, wherein the adjustable pressure in the sealed headspace is in the range of between about 1 atmosphere and about 20 atmosphere.

8. The method of claim 1, wherein at least one reactant system is partially embodied in said gas.

9. The method of claim 1, wherein the gaseous reactant comprises the atmosphere in the headspace over the reaction substrate.

10. The method of claim 1, wherein said thickness L is sufficient to allow the reaction to be independent of effects of the mass transport rate of a gaseous reactant into the liquid reactant system.

11. The method of claim 1, wherein said thickness L is sufficient to allow the reaction to be independent of effects of evaporation of the liquid reactant system.

12. A method for rapid screening of potential reactants, catalysts and reaction conditions, the method comprising:

adding a plurality of reactant systems to a reaction substrate to form a plurality of liquid reactant systems, wherein the reaction substrate has an adjustable first temperature, and each of the plurality reactant systems is at least partly embodied in a liquid film having a thickness L, wherein said thickness L is sufficient to allow the reaction to be independent of evaporation of the liquid film and the mass transport rate of a gas into the liquid;

maintaining an adjustable pressure in a sealed headspace in communication with the reactant system;

adding said gas to the sealed headspace, wherein said gas equilibrates with each of the plurality of liquid reactant systems;

maintaining the sealed headspace at an adjustable second temperature wherein the second temperature of the headspace is greater than the first temperature of the substrate reservoir;

allowing said gas to react with said plurality of liquid reactant systems for a predetermined amount of time; and analyzing results thereof in an effort to discover potentially effective reactants, catalysts and reaction conditions.

13. The method of claim 12, further comprising externally controlling said first and second temperatures.

14. The method of claim 12, wherein said defined pressure in said enclosed headspace is in the range of in between about 1 atmosphere and about 50 atmosphere.

15. The method of claim 14, wherein said defined pressure in said enclosed headspace is in the range of in between about 1 atmosphere and about 45 atmosphere.

16. The method of claim 15, wherein said defined pressure in said enclosed headspace is in the range of in between about 1 atmosphere and about 20 atmosphere.

17. The method of claim 12, further comprising at least one reactant partially embodied in said gas.

* * * * *